United States Patent
Propheter-Hinckley et al.

(10) Patent No.: US 10,746,038 B2
(45) Date of Patent: Aug. 18, 2020

(54) AIRFOIL WITH AIRFOIL PIECE HAVING RADIAL SEAL

(71) Applicant: UNITED TECHNOLOGIES CORPORATION, Farmington, CT (US)

(72) Inventors: Tracey A. Propheter-Hinckley, Manchester, CT (US); Michael G. McCaffrey, Windor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 630 days.

(21) Appl. No.: 15/354,054

(22) Filed: Nov. 17, 2016

(65) Prior Publication Data
US 2018/0135453 A1    May 17, 2018

(51) Int. Cl.
| F01D 11/02 | (2006.01) |
| F01D 11/00 | (2006.01) |
| F01D 17/16 | (2006.01) |
| F01D 5/14  | (2006.01) |
| F01D 9/04  | (2006.01) |

(Continued)

(52) U.S. Cl.
CPC ............. *F01D 11/025* (2013.01); *F01D 5/12* (2013.01); *F01D 5/147* (2013.01); *F01D 5/187* (2013.01); *F01D 5/284* (2013.01); *F01D 5/3084* (2013.01); *F01D 9/02* (2013.01); *F01D 9/041* (2013.01); *F01D 11/003* (2013.01); *F01D 17/162* (2013.01); *F02C 3/04* (2013.01); *F04D 29/083* (2013.01); *F04D 29/324* (2013.01); *F04D 29/542* (2013.01); *F05D 2220/32* (2013.01); *F05D 2230/90* (2013.01); *F05D 2240/35* (2013.01); *F05D 2240/57* (2013.01); *F05D 2250/20* (2013.01); *F05D 2300/20* (2013.01);
(Continued)

(58) Field of Classification Search
CPC .......... F01D 5/284; F01D 9/041; F01D 9/042; F01D 5/20; F05D 2240/125; F05D 2240/80
See application file for complete search history.

(56) References Cited

U.S. PATENT DOCUMENTS

| 2,919,890 A | 1/1960 | Smith et al. |
| 3,215,511 A | 11/1965 | Chisholm |

(Continued)

FOREIGN PATENT DOCUMENTS

| EP | 0764764 | 3/1997 |
| EP | 1239119 | 9/2002 |

(Continued)

OTHER PUBLICATIONS

U.S. Appl. No. 13/429,474, filed Mar. 26, 2012.
(Continued)

*Primary Examiner* — Kenneth Bomberg
*Assistant Examiner* — Andrew Thanh Bui
(74) *Attorney, Agent, or Firm* — Carlson, Gaskey & Olds, P.C.

(57) ABSTRACT

An airfoil includes an airfoil piece that defines at least a portion of an airfoil profile. The airfoil piece has a radial end and a first radial slot in the radial end. An end section has a second radial slot adjacent the first radial slot. The first radial slot and the second radial slot together form a radial seal slot. A seal is disposed in the radial seal slot.

18 Claims, 3 Drawing Sheets

(51) Int. Cl.

| | | |
|---|---|---|
| *F01D 5/18* | (2006.01) | |
| *F01D 5/28* | (2006.01) | |
| *F01D 5/12* | (2006.01) | |
| *F01D 9/02* | (2006.01) | |
| *F02C 3/04* | (2006.01) | |
| *F04D 29/08* | (2006.01) | |
| *F04D 29/32* | (2006.01) | |
| *F04D 29/54* | (2006.01) | |
| *F01D 5/30* | (2006.01) | |

(52) U.S. Cl.
CPC ............ *Y02T 50/672* (2013.01); *Y02T 50/673* (2013.01); *Y02T 50/676* (2013.01)

(56) References Cited

U.S. PATENT DOCUMENTS

| | | |
|---|---|---|
| 4,137,008 A | 1/1979 | Grant et al. |
| 4,247,259 A | 1/1981 | Saboe et al. |
| 4,396,349 A | 8/1983 | Hueber |
| 4,786,234 A | 11/1988 | Readnour |
| 4,856,962 A | 8/1989 | McDow |
| 4,914,794 A | 4/1990 | Strangman |
| 5,358,379 A | 10/1994 | Pepperman et al. |
| 5,538,380 A | 7/1996 | Norton et al. |
| 5,681,616 A | 10/1997 | Gupta et al. |
| 5,705,231 A | 1/1998 | Nissley et al. |
| 5,752,802 A * | 5/1998 | Jones .................. F01D 5/20 415/170.1 |
| 5,941,537 A | 8/1999 | Wallace et al. |
| 5,951,892 A | 9/1999 | Wolfla et al. |
| 6,000,906 A | 12/1999 | Draskovich |
| 6,102,656 A | 8/2000 | Nissley et al. |
| 6,224,963 B1 | 5/2001 | Strangman |
| 6,316,078 B1 | 11/2001 | Smialek |
| 6,503,574 B1 | 1/2003 | Skelly et al. |
| 6,514,046 B1 | 2/2003 | Morrison et al. |
| 6,543,996 B2 | 4/2003 | Koschier |
| 6,703,137 B2 | 3/2004 | Subramanian |
| 6,709,230 B2 | 3/2004 | Morrison et al. |
| 6,846,574 B2 | 1/2005 | Subramanian |
| 7,104,756 B2 * | 9/2006 | Harding .................. F01D 5/189 416/233 |
| 7,316,539 B2 | 1/2008 | Campbell |
| 7,326,030 B2 | 2/2008 | Albrecht et al. |
| 7,435,058 B2 | 10/2008 | Campbell et al. |
| 7,452,182 B2 | 11/2008 | Vance et al. |
| 7,452,189 B2 * | 11/2008 | Shi .......................... F01D 5/147 415/200 |
| 7,520,725 B1 | 4/2009 | Liang |
| 7,600,967 B2 * | 10/2009 | Pezzetti, Jr. .......... F01D 11/005 415/115 |
| 7,670,116 B1 | 3/2010 | Wilson, Jr. et al. |
| 7,963,745 B1 | 6/2011 | Liang |
| 8,079,806 B2 | 12/2011 | Tholen et al. |
| 8,142,163 B1 * | 3/2012 | Davies .................... F01D 5/147 416/225 |
| 8,182,208 B2 | 5/2012 | Bridges, Jr. et al. |
| 8,197,211 B1 | 6/2012 | Liang |
| 8,202,043 B2 | 6/2012 | McCaffrey |
| 8,251,651 B2 | 8/2012 | Propheter-Hinckley et al. |
| 8,366,392 B1 | 2/2013 | Laing |
| 8,480,366 B2 | 7/2013 | Malecki et al. |
| 8,500,392 B2 * | 8/2013 | Durocher ................ F01D 9/06 415/116 |
| 8,506,243 B2 | 8/2013 | Strock et al. |
| 8,668,448 B2 * | 3/2014 | Farah .................... F01D 9/042 415/209.4 |
| 8,821,124 B2 | 9/2014 | Viens et al. |
| 8,926,262 B2 * | 1/2015 | Tanahashi ............ F01D 5/282 415/9 |
| 9,080,448 B2 * | 7/2015 | King ...................... F01D 9/041 |
| 9,726,028 B2 * | 8/2017 | Marra .................... F01D 9/042 |
| 2006/0228211 A1 | 10/2006 | Vance et al. |
| 2008/0159850 A1 | 7/2008 | Tholen et al. |
| 2010/0068034 A1 | 3/2010 | Schiavo et al. |
| 2010/0136258 A1 | 6/2010 | Strock et al. |
| 2011/0158793 A1 | 6/2011 | Fritsch |
| 2013/0004294 A1 * | 1/2013 | Marra .................... F01D 9/042 415/115 |
| 2013/0236318 A1 * | 9/2013 | Prue ...................... F01D 5/005 416/223 A |
| 2013/0343878 A1 | 12/2013 | Propheter-Hinckley |
| 2015/0377035 A1 * | 12/2015 | Freeman ................ F01D 11/12 416/191 |
| 2016/0090851 A1 | 3/2016 | Carr et al. |
| 2016/0102577 A1 | 4/2016 | Grant et al. |

FOREIGN PATENT DOCUMENTS

| | | |
|---|---|---|
| EP | 1764481 | 3/2007 |
| EP | 2105579 | 9/2009 |
| EP | 2636846 | 9/2013 |
| EP | 2853688 | 4/2015 |
| EP | 3159484 | 4/2017 |
| GB | 2272453 | 5/1994 |
| GB | 2378733 | 2/2003 |
| JP | 61066802 | 4/1986 |
| JP | 05321602 | 12/1993 |
| JP | 2007255224 | 10/2007 |
| WO | 2013189883 | 12/2013 |
| WO | 2015075233 | 5/2015 |

OTHER PUBLICATIONS

U.S. Appl. No. 14/659,718, filed Mar. 17, 2015.
U.S. Appl. No. 14/812,668, filed Jul. 29, 2015.
European Search Report for European Patent Application No. 17202316.0 dated Mar. 19, 2018.

* cited by examiner

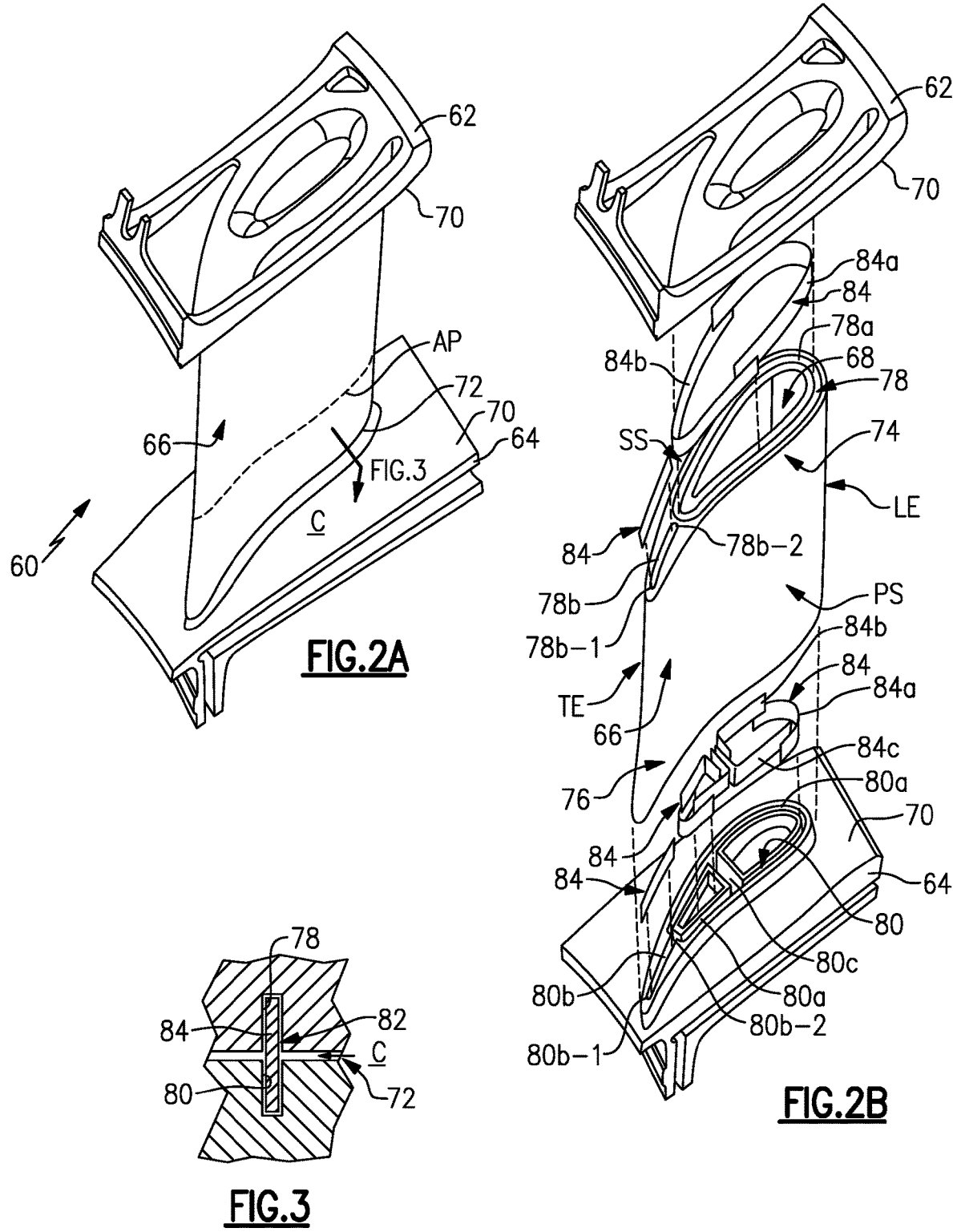

US 10,746,038 B2

AIRFOIL WITH AIRFOIL PIECE HAVING RADIAL SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An airfoil according to an example of the present disclosure includes an airfoil piece that defines at least a portion of an airfoil profile. The airfoil piece has a radial end and a first radial slot in the radial end, and an end section that has a second radial slot adjacent the first radial slot. The first radial slot and the second radial slot together form a radial seal slot. A seal is disposed in the radial seal slot.

In a further embodiment of any of the foregoing embodiments, the seal is a feather seal.

In a further embodiment of any of the foregoing embodiments, the feather seal includes a plurality of feather seal pieces.

In a further embodiment of any of the foregoing embodiments, the airfoil piece defines a portion of the airfoil profile.

In a further embodiment of any of the foregoing embodiments, the airfoil profile has a leading end, a trailing end, a suction side, and a pressure side, and the airfoil piece defines the leading end.

In a further embodiment of any of the foregoing embodiments, the airfoil piece defines a complete airfoil profile, including a leading end, a trailing end, a suction side, and a pressure side.

In a further embodiment of any of the foregoing embodiments, the first radial slot and the second radial slot are endless loops.

In a further embodiment of any of the foregoing embodiments, the first radial slot and the second radial slot are each elongated and each have first and second terminal ends.

In a further embodiment of any of the foregoing embodiments, the end section is an endwall section that includes a platform.

In a further embodiment of any of the foregoing embodiments, the end section includes a cover piece, and the cover piece includes the second radial slot.

In a further embodiment of any of the foregoing embodiments, the airfoil piece is formed of a ceramic.

In a further embodiment of any of the foregoing embodiments, the seal is a feather seal that includes a plurality of feather seal pieces. The first radial slot and the second radial slot are endless loops, and the airfoil piece is formed of a ceramic.

A gas turbine engine according to an example of the present disclosure include a compressor section, a combustor in fluid communication with the compressor section, and a turbine section in fluid communication with the combustor. One of the turbine section or the compressor section includes an airfoil that has an airfoil piece that defines at least a portion of an airfoil profile. The airfoil piece has a radial end and a first radial slot in the radial end. An end section has a second radial slot adjacent the first radial slot. The first radial slot and the second radial slot together form a radial seal slot. A seal is disposed in the radial seal slot.

In a further embodiment of any of the foregoing embodiments, the seal is a feather seal.

In a further embodiment of any of the foregoing embodiments, the first radial slot and the second radial slot are endless loops.

In a further embodiment of any of the foregoing embodiments, the feather seal includes a plurality of feather seal pieces and the airfoil piece is formed of a ceramic.

An article according to an example of the present disclosure includes an airfoil piece that defines at least a portion of an airfoil profile. The airfoil piece has a radial end and a first radial slot in the radial end. The radial slot is configured to receive a seal.

A further embodiment of any of the foregoing embodiments include the seal partially disposed in the first radial slot.

In a further embodiment of any of the foregoing embodiments, the airfoil piece is hollow.

In a further embodiment of any of the foregoing embodiments, the first radial slot is an endless loop and the airfoil piece is formed of a ceramic.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2A illustrates an example airfoil of the gas turbine engine.

FIG. 2B illustrates an expanded view of the airfoil of FIG. 2A.

FIG. 3 illustrates a sectioned view through a seal slot and seal.

DETAILED DESCRIPTION

Figure 1:
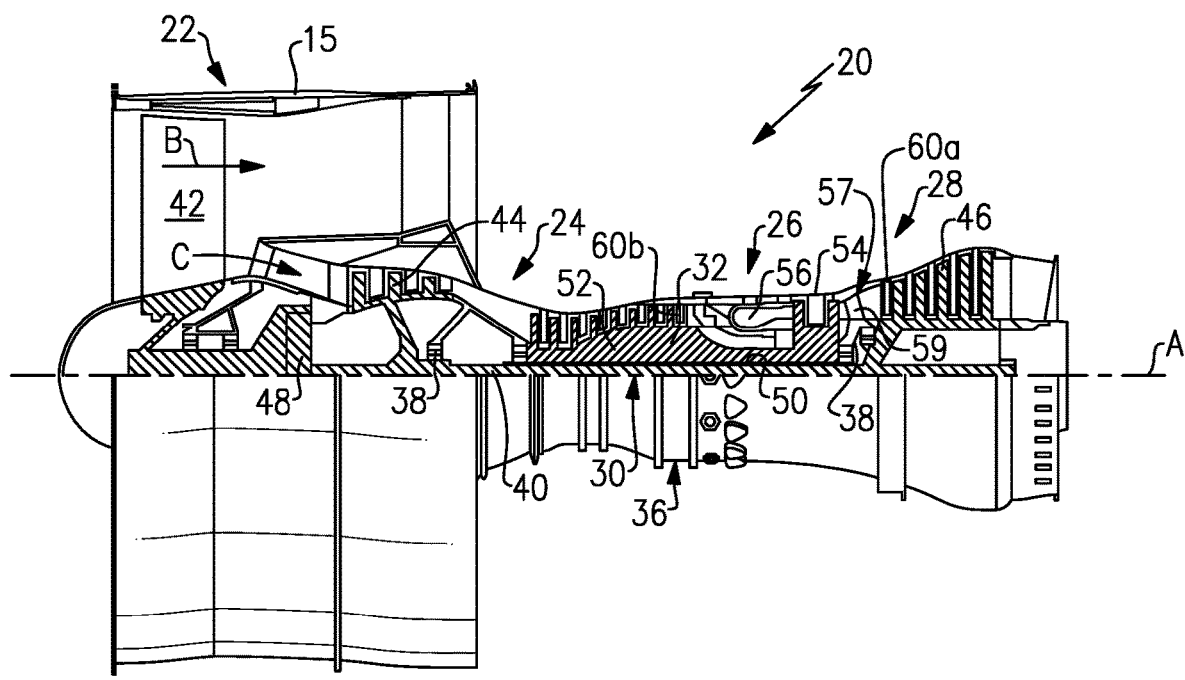
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 may be connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36, if included, is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans and gas turbines with multiple bypass streams.

A significant amount of thrust is provided by the bypass flow B due to the high bypass ratio. The fan section 22 of the engine 20 may be designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second.

In gas turbine engines air is often bled from the compressor for cooling components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

FIG. 2A illustrates an example airfoil 60 used in the engine 20, and FIG. 2B illustrates an expanded view of the airfoil 60. For instance, the airfoil 60 can be a turbine vane, as represented at 60a in FIG. 1, or a compressor vane, as represented at 60b in FIG. 1. In this example, the airfoil 60 is a static vane. As will be appreciated, although the examples herein are described in the context of a vane, this disclosure is not limited to vanes, and the examples may also be applicable to blades or other airfoils that are exposed to high temperatures.

The airfoil 60 includes a first or outer end section 62, a second or inner end section 64, and an airfoil piece 66 that spans in a longitudinal direction between the first and second end sections 62/64. The longitudinal direction is also the radial direction in the engine 20 with regard to the engine central axis A. The airfoil piece 66 defines at least a portion of an airfoil profile, AP, which is the peripheral shape of the airfoil piece 66 when viewed in a radial direction. For example, the airfoil profile has a wing-like shape that provides a reaction force via Bernoulli's principle with regard to flow over the airfoil piece 66. The full or complete airfoil profile AP generally includes a leading end (LE), a trailing end (TE), a pressure side (PS), and a suction side (SS). For example, the leading end (LE) is the region of the airfoil profile (AP) that includes a leading edge of the airfoil profile (AP), and the trailing end (TE) is the region of the airfoil profile that includes a trailing edge. The leading edge may be the portion of the airfoil profile (AP) that first contacts air or the foremost edge of the airfoil profile (AP). The trailing edge may be the portion of the airfoil profile (AP) that last contacts air or the aftmost edge of the airfoil profile (AP). For a variable vane, the leading edge may shift, depending on the orientation of the vane. In this example, the airfoil piece 66 defines the full or complete airfoil profile (AP).

The airfoil piece 66 is hollow and includes one or more internal cavities 68. The internal cavity or cavities 68 may be provided with cooling bleed air from the compressor section 24 of the engine 20, to cool the airfoil 60. In this example of a static vane, and the end sections 62/64 include respective platforms 70. Together, the platforms 70 provide the inner and outer bounds of the core gas path.

The end sections 62/64 and the airfoil piece 66 are most typically separate pieces initially. The airfoil piece 66 may be mechanically clamped between the end sections 62/64 by a tie member (not shown) or other mechanical fastener device. In this regard, the airfoil piece 66 may fit with the end sections 62/64 to ensure proper positioning of the airfoil piece 66. As an example, the airfoil piece 66 interfits with the end sections 62/64 such that the exterior surfaces of the airfoil piece 66 are substantially flush with the exterior surfaces of the end sections 62/64. For instance, the end sections 62/64 may have a recess, a lip, or the like that fits with the airfoil piece 66.

Even if the airfoil piece 66 is tightly secured with the end sections 62/64, there is the potential that gases in the core gas path leak into the airfoil 60 through seams 72 between the airfoil piece 66 and the end sections 62/64. For instance, the pressure on the pressure side (PS) of the airfoil piece 66 is higher than the pressure on the suction side (SS) and there is, therefore, a tendency for the gas to migrate from the core gas path into such seams 72. As will be described in more detail below, the airfoil 60 includes features to facilitate limiting this leak of gas from the core gas path into the airfoil piece 66 (and end sections 62/64).

The airfoil piece 66 spans between inner and outer radial ends 74/76. The radial ends 74/76 include the end regions of the airfoil piece 66, not just the terminal radial faces of the airfoil piece 66. The outer radial end 74 includes a first radial slot 78. In this example, although obscured from view, the inner radial end 76 also includes a first radial slot 78.

The end section 64 includes a second radial slot 80. In this example, although obscured from view, the end section 62 also includes a second radial slot 80. Each second radial slot 80 is adjacent a corresponding first radial slot 78. Thus in this example, when the airfoil piece 66 is brought into proximity to the end section 64, the first radial slot 78 in the inner end 76 of the airfoil piece 66 aligns with the second radial slot 80 in the end section 64. Likewise, when the airfoil piece 66 is brought into proximity to the end section 62, the first radial slot 78 in the outer end 74 of the airfoil piece 66 aligns with the second radial slot 80 in the end section 62.

As shown in a representative sectioned view in FIG. 3, the first radial slot 78 and the second radial slot 80 together form a radial seal slot 82. Prior to bringing the slots 78/80 together, a seal 84 is disposed in one or the other of the slots 78 or 80. In the illustrated example, the seal 84 is a feather seal. The feather seal may be a relatively thin, flat sheet of metal and may be flexible. Once the slots 78/80 are brought together to form the seal slot 82, the seal 84 is disposed in the seal slot 82. In this example, the seal 84 serves as a type of labyrinth seal to block gas from entering into the airfoil 60 from the core gas path (C).

In this example, the airfoil piece 66 also includes several different types of first slots 78, which are individually designated 78a/78b. As will be appreciated, the number and location of the slots 78a/78b could be varied from the configuration that is shown. The slot 78a is an endless loop slot; and the slot 78b is a line slot. The slot 78b is elongated and has first and second terminal ends 78b-1/78b-2 (and is thus not endless). Although obscured from view, the end section 62 will include corresponding second slots 80 that align with the slots 78a/78b to capture respective seals 84 there between.

Similarly, the end section 64 may include different types of second slots 80, which are individually numbered 80a/80b. The slot 80a is an endless loop slot; and the slot 80b is a line slot. In this example, there are two endless loop slots, which may share a common side at slot portion 80c. The slot 80b is elongated and has first and second terminal ends 80b-1/80b-2 (and is thus not endless). Although obscured from view, the inner end 76 of the airfoil piece 66 will include corresponding first slots 78 that align with the slots 80a/80b to capture respective seals 84 there between.

The different types of slots 78/80 serve different sealing functions in the airfoil 60. For example, the endless loop slots may circumscribe an internal cavity 68 in the airfoil piece 66 and thus block gas from the core gas path from entering into the internal cavity 68. The line slots extend mainly axially and thus block gas from the pressure side (PS) from migrating through the seams 72 to the suction side (SS). For instance, in the example shown, the line slots are utilized in the trailing end (TE).

In the illustrated example, each seal 84 is a compound feather seal that includes a plurality of seal feather seal pieces, designated as 84a/84b/84c. Alternatively, one or more of the seals 84 could be a mono-piece seal. As an example, the seal 84 in the slots 80a in the end section 64 has three feather seal pieces 84a/84b/84c, and the seal 84 in the slot 78a has two feather seal pieces 84a/84b. The feather seal pieces 84a/84b/84c are free-floating in the seal slots 82 (FIG. 3) and are thus free to move with respect to each other, within the confines of the seal slots 82. The free-floating serves to permit the seal pieces 84a/84b/84c to thermally expand/contract without forming "kinks" due to confinement in the seal slots 82.

The use of the seal pieces 84a/84b/84c and the free-floating arrangement also permits enhanced sealing. For example, the pressure inside the airfoil piece 66 (i.e., in the internal cavity 68) is greater than the exterior pressure around the airfoil piece 66 when in operation in the engine 20 (e.g., during take-off, cruise, and/or landing). This pressure differential urges the seal pieces 84a/84b/84c against the lateral sides of the slots 78/80, in essence conforming the seal pieces 84a/84b/84c to the lateral sides. The conformance, in turn, blocks gas from passing by the seal pieces

84a/84b/84c and into the airfoil 60. Since the seal pieces 84a/84b/84c are free-floating, there is reduced potential of forming "kinks" that might otherwise inhibit conformance.

Figure 4A:
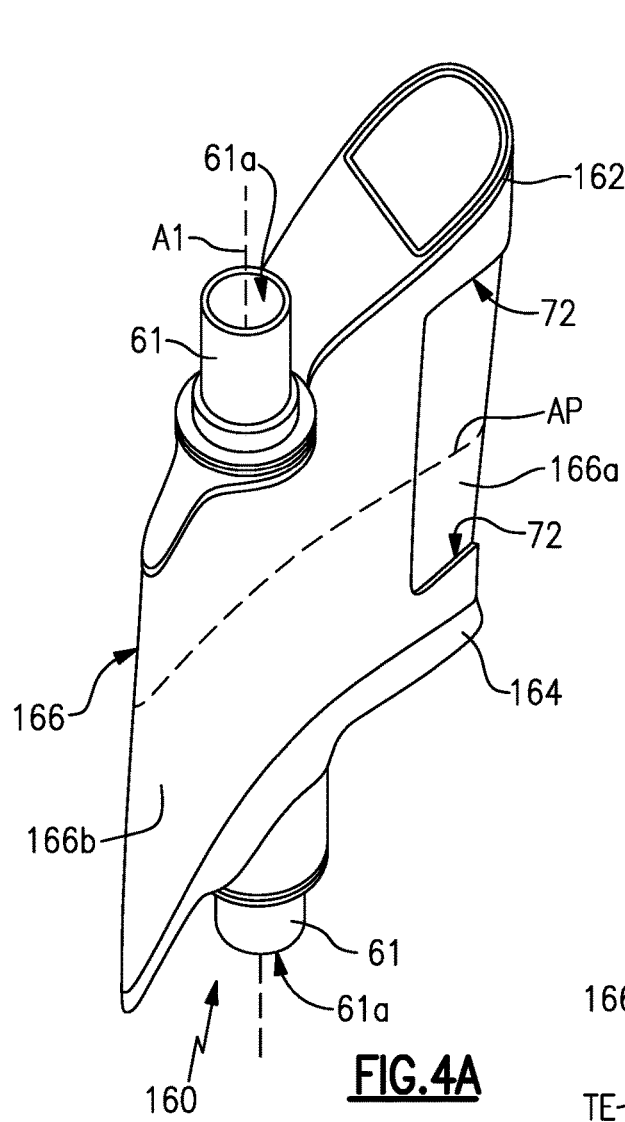
FIG. 4A illustrates another example airfoil.
Figure 4B:
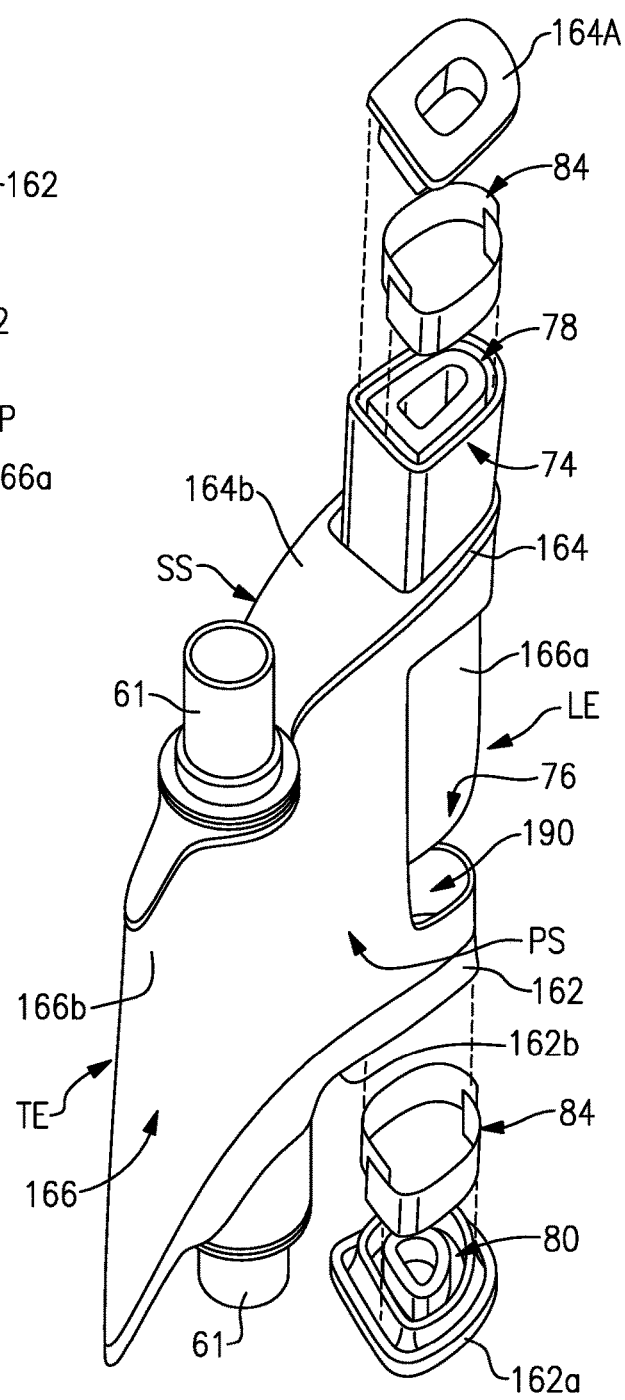
FIG. 4B illustrates an expanded view of the airfoil of FIG. 4A.

FIG. 4A illustrates another example airfoil 160. In this disclosure like reference numerals designate like elements where appropriate and reference numerals with the addition of one-hundred or multiples thereof designate modified elements that are understood to incorporate the same features and benefits of the corresponding elements. Here, the airfoil 160 is a variable vane that is rotatable about axis A1. In this regard, the end sections 162/164 include axles or spindles 61. The spindles 61 may include respective inlet passages 61a, through which cooling bleed air may be provided into the airfoil 160. Additionally, rather than the end sections 62/64 with the platforms 70, the end sections 162/164 are aerodynamically shaped.

In this example, the airfoil section 166 includes an airfoil piece 166a and an airfoil body portion 166b. The airfoil body portion 166b includes a retention pocket 190 that secures the airfoil piece 166a in place. The airfoil body portion 166b defines a portion of the airfoil profile (AP), and the airfoil piece 166a defines a different portion of the airfoil profile (AP). Here, the airfoil body portion 166b defines the trailing end (TE), the suction side (SS), and the pressure side (PS), and the airfoil piece 166a defines the leading end (LE) or at least a portion of the leading end (LE).

The outer and inner ends 74/76 of the airfoil piece 166a include one or more first slots 78, and the end sections 162/164 includes second slots 80. In this example, the end sections 162/164 include cover pieces 162a/164a and base pieces 162b/164b. The second slots 80 are on the cover pieces 162a/162b, and the cover pieces 162a/162b are then attached to the base pieces 162b/164b (e.g., by mechanical fastening, welding, brazing, or the like). As described above, the slots 78/80 together form the seal slot 82, and the seal 84 is disposed in the seal slot 82 (FIG. 3) to block gas from flowing through the seams 72.

Should the airfoil pieces 66/166a require replacement, the airfoil 60/160 can be disassembled, the airfoil piece 66/166a can be replaced with a new one, and the airfoil 60/160 can be reassembled. Accordingly, the airfoil pieces 66/166a can be produced individually as new articles for original airfoils 60/160 or as individual replacement articles for existing airfoils.

The materials of which the airfoil 60/160 is formed of may be selected to enhance the performance. For example, the airfoil piece 66/166a and airfoil body portion 166b may be formed of a ceramic or of a metal. For instance, the airfoil piece 166a is ceramic and the airfoil body portion 166b is metal. Metal alloys provide a good combination of strength and durability. Example alloys may include, but are not limited to, nickel alloys, cobalt alloys, a nickel alloy coated with cobalt or cobalt alloy, or non-nickel alloys that do not substantially react with ceramic. Ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

If enhanced thermal or environmental resistance is desired, the airfoil piece 66/166a and airfoil body portion 166b may be coated with a thermal and/or environmental barrier ceramic coating, including but not limited to segmented coatings. As an example, the ceramic may include or may be oxides, carbides, nitrides, borides, silicides, or combinations thereof. In further examples, the ceramic may be or may include yttria stabilized with zirconia, hafnia, and/or gadolinia, gadolinia zirconate, molybdate, alumina, or combinations thereof.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil piece defining at least a portion of an airfoil profile, the airfoil piece having a radial end and a first radial slot in the radial end;
   an end section having a second radial slot bottom wall, each of the first radial slot and the second radial slot being defined by opposed side walls and a bottom wall, the first radial slot and the second radial slot opening toward each other in a radial direction, the first radial slot and the second radial slot together forming a radial seal slot; and a feather seal disposed in the radial seal slot.

2. The airfoil as recited in claim 1, wherein the feather seal includes a plurality of feather seal pieces.

3. The airfoil as recited in claim 1, wherein the airfoil piece defines a portion of the airfoil profile.

4. The airfoil as recited in claim 3, wherein the airfoil profile has a leading end, a trailing end, a suction side, and a pressure side, and the airfoil piece defines the leading end.

5. The airfoil as recited in claim 1, wherein the airfoil piece defines a complete airfoil profile, including a leading end, a trailing end, a suction side, and a pressure side.

6. The airfoil as recited in claim 1, wherein the first radial slot and the second radial slot are endless loops.

7. The airfoil as recited in claim 1, wherein the first radial slot and the second radial slot are each elongated and each have first and second terminal ends.

8. The airfoil as recited in claim 1, wherein the end section is an endwall section that includes a platform.

9. The airfoil as recited in claim 1, wherein the end section includes a cover piece, and the cover piece includes the second radial slot.

10. The airfoil as recited in claim 1, wherein the airfoil piece is formed of a ceramic.

11. The airfoil as recited in claim 1, wherein the feather seal includes a plurality of feather seal pieces, the first radial slot and the second radial slot are endless loops, and the airfoil piece is formed of a ceramic.

12. A gas turbine engine comprising:
    a compressor section;

a combustor in fluid communication with the compressor section; and
a turbine section in fluid communication with the combustor, at least one of the turbine section or the compressor section including an airfoil having
an airfoil piece defining at least a portion of an airfoil profile, the airfoil piece having a radial end and a first radial slot in the radial end;
an end section having a second radial slot adjacent the first radial slot, each of the first radial slot and the second radial slot being defined by opposed side walls and a bottom wall, the first radial slot and the second radial slot opening toward each other in a radial direction, the first radial slot and the second radial slot together forming a radial seal slot; and
a feather seal disposed in the radial seal slot.

13. The gas turbine section as recited in claim 12, wherein the first radial slot and the second radial slot are endless loops.

14. The gas turbine engine as recited in claim 13, wherein the feather seal includes a plurality of feather seal pieces and the airfoil piece is formed of a ceramic.

15. The airfoil as recited in claim 1, wherein the feather seal is free-floating in the radial seal slot.

16. The airfoil as recited in claim 15, wherein the feather seal includes a first and second feather seal pieces.

17. The airfoil as recited in claim 16, wherein the first and second feather seal pieces overlap.

18. The airfoil as recited in claim 17, wherein the first radial slot and the second radial slot are endless loops.

* * * * *